United States Patent [19]
Rubin

[11] 4,056,373
[45] Nov. 1, 1977

[54] HYDROGEN-PURIFICATION APPARATUS WITH PALLADIUM-ALLOY FILTER COIL

[75] Inventor: Leonard Roy Rubin, Short Hills, N.J.

[73] Assignee: Resource Systems, Inc., East Hanover, N.J.

[21] Appl. No.: 686,238

[22] Filed: May 12, 1976

[51] Int. Cl.² .............................................. B01D 13/00
[52] U.S. Cl. .................................. 55/158; 29/401 R; 29/402; 55/16; 55/520; 55/529; 138/97
[58] Field of Search ................... 55/16, 158, 461, 522, 55/529, 520; 210/321 B, 497.1; 29/401 R, 401 F, 402; 138/97, 129, 134; 72/138

[56] References Cited
U.S. PATENT DOCUMENTS

| 2,458,118 | 1/1949 | Tursky | 210/497.1 X |
| 3,149,775 | 9/1964 | Pagano | 55/158 X |
| 3,208,198 | 9/1965 | Rubin | 55/158 X |
| 3,469,372 | 9/1969 | Yamauchi et al. | 55/158 |
| 3,638,684 | 2/1972 | Pavilon | 29/401 X |
| 3,665,680 | 5/1972 | Heuser | 55/158 |
| 3,782,904 | 1/1974 | Fletcher | 55/16 X |
| 3,962,767 | 6/1976 | Byerley et al. | 138/97 X |
| 3,966,646 | 6/1976 | Noakes et al. | 55/520 X |
| 3,983,194 | 9/1976 | Richardson et al. | 210/497.1 X |

Primary Examiner—Frank W. Lutter
Assistant Examiner—Kathleen J. Prunner
Attorney, Agent, or Firm—Jonathan Myers

[57] ABSTRACT

A hydrogen-purification filter has a closed chamber with a pure-hydrogen outlet. A coil made of thin palladium-alloy tubing is contained in this chamber and has an inlet end and an outlet end accessible from outside the chamber. This coil is of D-section so that in case a leak forms the turn of the coil containing the leak can be excised by cutting at the straight sections on both sides of the leak and the remaining coil rejoined at the straight sections.

2 Claims, 5 Drawing Figures

HYDROGEN-PURIFICATION APPARATUS WITH PALLADIUM-ALLOY FILTER COIL

FIELD OF THE INVENTION

The present invention relates to a gas-purification apparatus. More particularly this invention concerns a hydrogen permeation filter using a palladium-alloy filter element.

BACKGROUND OF THE INVENTION

A hydrogen filter is known having a gastight chamber in which is provided a coil of tubing of palladium alloy. The coil has at one end an externally accessible input end and at the other end of the coil an externally accessible output end. Impurity-carrying hydrogen is fed under pressure into the input end and a waste gas containing all of the impurities is withdrawn from the output end of the coil. Hydrogen permeates through the palladium-alloy wall of the coil and can be withdrawn from the interior of the chamber. Such a filter is termed an absolute filter as nothing but hydrogen can pass through the walls of the tubing, so that hydrogen of perfect purity can be withdrawn from the chamber.

The tubing typically has a 0.125 inch diameter and a wall thickness of 0.004 inch. Between 5 and 50 feet of such tubing are used in a filter coil. The palladium alloy constituting the tubing is extremely valuable.

In such a filter a mere pinhole leak in the tubing can render the device useless. The extremely valuable palladium-alloy coil must be replaced in its entirety if it develops a leak, as no method has been devised for plugging a leak or replacing a coiled thin-walled tubing section.

OBJECTS OF THE INVENTION

It is therefore an object of the present invention to provide an improved gas-purification apparatus.

Another object is the provision of a method of repairing a hydrogen purifier of the above-described general type having a thin-walled palladium-alloy permeation coil.

SUMMARY OF THE INVENTION

These objects are attained according to the present invention in a gas-filtering device of the above-described general type wherein the helicoidal multiturn coil has a plurality of turns formed with straight sections. In case a leak appears the coil is severed at the straight sections to either side of the leak and the free ends of the remaining sound coil are connected in place.

In accordance with this invention the joining of two sections at flat regions is carried out by introducing the two ends into a sleeve and soldering or brazing them together in this sleeve, or the one end is radially expanded and the other end fitted into it and similarly brazed or soldered into place.

The arrangement according to the present invention makes it possible to repair the palladium-alloy coil of a permeation filter. In view of the high cost of the metal, the labor involved in such a repair is economically justifiable. Furthermore it is possible with the system of this invention to combine multiple coil sections of shorter length and employ them as the coil of a filter of greater length. In the manufacture of such filters it is possible to fabricate coils in lengths greater than can be obtained from tubing drawn in one piece by combining sections to obtain the desired length.

According to another feature of this invention the coil is elongated and of D-section. Such a coil is formed by winding the palladium-alloy tubing around a D-section mandrel in a manner well known. Thus each turn has one straight section.

SPECIFIC DESCRIPTION

Figure 1:
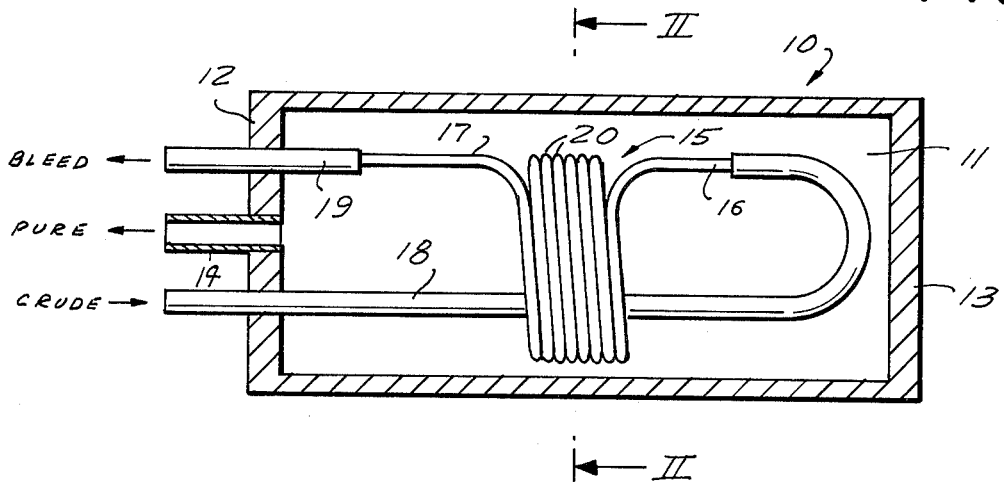
FIG. 1 is a section taken axially through a gas-purification apparatus in accordance with this invention.
Figure 2:
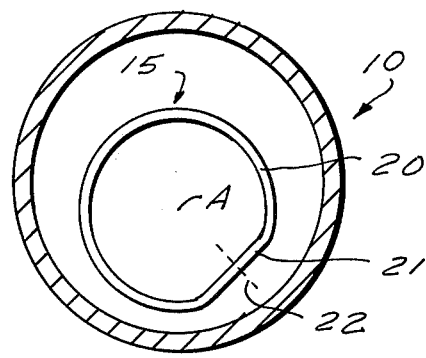
FIG. 2 is a section taken along line II—II of FIG. 1.

As shown in FIGS. 1 and 2 a gas-purification apparatus has a closed housing 10 having a hollow interior 11, an end wall 12, an opposite end wall 13, and an exhaust nipple 14.

Provided inside the housing is a coil 15 formed of palladium-alloy tubing having a diameter of 0.125 inch and a wall thickness of 0.004 inch. This coil 15 has an inlet end 16 and an outlet end 17. The inlet end 16 is connected through a J-shaped inlet tube 18 to a source of crude gas to be purified, this tube 18 projecting through the end wall 12. The outlet end 17 is fitted into a straight outlet tube 19 that passes through the end wall 12 also and is the bleed outlet of the device. A plurality of D-section turns 20 best shown in FIG. 2 constitute this coil 15. Each such turn 20 therefore has a straight section 21 which here subtends an angle of approximately 60° relative to the central axis A of the coil 15.

Figure 3:
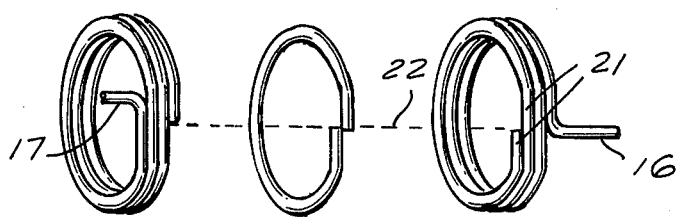
FIG. 3 is a perspective view of the coil of the arrangement of FIGS. 1 and 2 illustrating repair of this coil.

In case the coil 15 develops a leak it is merely necessary as shown in FIG. 3 to excise from it the turn that has the leak, cutting at the center of the sections 21 on both sides of the leak as shown by the dashed line 22 of FIG. 3.

Figure 4:
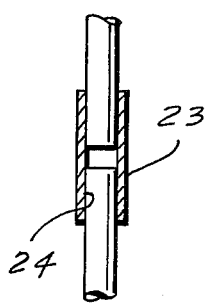
FIGS. 4 and 5 are side sectional views in enlarged scale illustrating the methods of repair.
Figure 5:
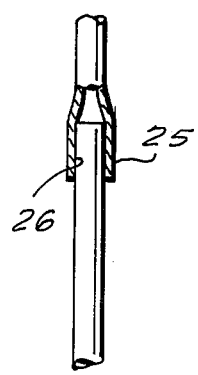

Then the cut ends are joined together by slipping a short sleeve 23 over the two ends as shown in FIG. 4 and brazing it in place as indicated at 24, or by widening the one end as shown at 25 in FIG. 5 and fitting it over the other end and brazing it in place as shown at 26.

It should be noted that although the system described above employs a D-section coil, with a single straight section in each turn, it is also within the scope of this invention to use a coil only having a straight section every other, every third, every fourth turn, and so on. Furthermore a polygonal-section coil would allow less than an entire turn not composed of a whole number of turns to be replaced.

I claim:

1. An apparatus for gas purification which comprises:
a closed chamber;
an inlet opening into said chamber;
a bleed opening from said chamber;
a helical, tubular, palladium-alloy permeation filter coil within said chamber and connected at one end to said inlet opening and at the other end to said bleed opening, said coil having a multiplicity of turns between its ends, at least some of said turns of said helical coil consisting of respective arcuate segments and respective straight segments interconnecting the arcuate segments of adjacent turns; and
an outlet opening from said chamber.

2. The apparatus defined in claim 1 wherein the straight segments of said turns substantially all line up on the same side of said coil.

* * * * *